US010433023B1

(12) United States Patent
Joliveau et al.

(10) Patent No.: US 10,433,023 B1
(45) Date of Patent: Oct. 1, 2019

(54) HEURISTICS FOR STREAMING LIVE CONTENT

(71) Applicant: Amazon Technologies, Inc., Seattle, WA (US)

(72) Inventors: Marc Joliveau, Seattle, WA (US); Nicholas James Benson, Seattle, WA (US); Lei Li, Kirkland, WA (US); Stefan Christian Richter, Seattle, WA (US); Michael Robert Starr, Seattle, WA (US); Li Tong, Seattle, WA (US); Amarsingh Buckthasingh Winston, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 58 days.

(21) Appl. No.: 14/924,413

(22) Filed: Oct. 27, 2015

(51) Int. Cl.

| H04N 21/6373 | (2011.01) |
|---|---|
| H04N 21/2187 | (2011.01) |
| H04N 21/262 | (2011.01) |
| H04N 21/845 | (2011.01) |
| G11B 27/10 | (2006.01) |
| H04N 21/647 | (2011.01) |
| H04N 21/2385 | (2011.01) |

(52) U.S. Cl.
CPC ......... *H04N 21/6373* (2013.01); *G11B 27/10* (2013.01); *H04N 21/2187* (2013.01); *H04N 21/2385* (2013.01); *H04N 21/2625* (2013.01); *H04N 21/64738* (2013.01); *H04N 21/8456* (2013.01)

(58) Field of Classification Search
CPC ............ H04N 21/631; H04N 21/6373; H04N 21/6379; H04N 21/2401; H04N 21/44245; H04N 21/26258; H04N 21/64792; H04N 21/64769; H04N 21/234327; H04N 21/845; H04N 21/8451
See application file for complete search history.

(56) References Cited

U.S. PATENT DOCUMENTS

| 9,503,492 B2* | 11/2016 | Park | H04L 65/4084 |
|---|---|---|---|
| 2009/0043906 A1* | 2/2009 | Hurst | H04N 21/23439 709/231 |
| 2011/0239078 A1* | 9/2011 | Luby | H04N 21/23106 714/752 |
| 2013/0227122 A1* | 8/2013 | Gao | H04L 65/1083 709/224 |

(Continued)

OTHER PUBLICATIONS

ISO/IEC PDTR 23009-3 "Information technology—Dynamic adaptive streaming over HTTP (DASH)—Part 3: Implementation guidelines" published in Jan. 25, 2013.*

*Primary Examiner* — Benjamin R Bruckart
*Assistant Examiner* — Anthony Bantamoi
(74) *Attorney, Agent, or Firm* — Weaver Austin Villeneuve & Sampson LLP

(57) ABSTRACT

Techniques for delivering live streaming content are described by which a streaming heuristic is selected based on the delay between the live and client playheads. For live content for which the delay is short, a low latency streaming heuristic is selected which is designed to handle live content streams for which only a few seconds of content can be buffered. For live content for which the delay is longer, a higher latency streaming heuristic is selected which is designed to handle streams for which the delay is sufficient to build a buffer of content fragments.

20 Claims, 5 Drawing Sheets

(56) References Cited

U.S. PATENT DOCUMENTS

| | | | | |
|---|---|---|---|---|
| 2013/0326024 | A1* | 12/2013 | Chen | G06F 15/16 |
| 2013/0332623 | A1* | 12/2013 | Gahm | H04L 65/4092 |
| | | | | 709/234 |
| 2014/0143439 | A1* | 5/2014 | Ramamurthy | H04N 21/23439 |
| | | | | 709/231 |
| 2014/0189771 | A1* | 7/2014 | Park | H04N 21/44209 |
| | | | | 725/116 |
| 2015/0098327 | A1* | 4/2015 | Gahm | H04L 47/76 |
| | | | | 370/230 |
| 2015/0172340 | A1* | 6/2015 | Lohmar | H04N 21/2401 |
| | | | | 709/219 |
| 2015/0207743 | A1* | 7/2015 | Zanger | H04L 67/14 |
| | | | | 709/233 |
| 2015/0271231 | A1* | 9/2015 | Luby | H04L 65/4084 |
| | | | | 709/231 |
| 2016/0006805 | A1* | 1/2016 | Ulupinar | H04L 67/02 |
| | | | | 709/217 |
| 2016/0191585 | A1* | 6/2016 | Ramamurthi | H04L 65/4084 |
| | | | | 709/231 |
| 2016/0294898 | A1* | 10/2016 | Wheelock | H04L 65/4076 |
| 2017/0041252 | A1* | 2/2017 | Das | H04L 49/9005 |
| | | | | 725/89 |

* cited by examiner

HEURISTICS FOR STREAMING LIVE CONTENT

BACKGROUND

Live streaming content includes channels or feeds with scheduled content (e.g., premium movie channels) and live broadcasts (e.g., sporting events, news, etc.). Unlike video-on-demand (VOD) content, live streaming content typically does not have a distinct end point and may continue indefinitely. In addition, VOD content may be buffered in client devices well in advance of the client playhead (i.e., the content fragment being currently rendered by the client). This is typically not the case for live content because of the constraint that the delay between the live playhead (i.e., the latest content fragment available) and the client playhead should be as low as possible, as well as the fact that the live content is being generated in real time and therefore may not yet exist.

There is a tradeoff between minimizing the delay between the live playhead and the client playhead on the one hand, and the quality and/or reliability of the delivered content on the other. The shorter the delay, the more difficult it is for the client to buffer fragments ahead of the client playhead. Under such conditions, a conservative bitrate selection algorithm favoring lower bitrates is appropriate from a reliability perspective as the client cannot rely on buffer fullness to maintain the stream in the face of unexpected events (e.g., bandwidth drops, download retries, etc.). However, this may result in video of an unacceptably low quality. On the other hand, the longer the delay between the live and client playheads, the more able the client is to reliably download higher quality fragments. However, the longer the delay, the more out of sync the viewer's experience is from the live experience she expects.

DETAILED DESCRIPTION

This disclosure describes techniques for delivering live streaming content that attempt to strike an appropriate balance between the delay between the live and client playheads, and the quality and/or reliability of the delivered content. A streaming heuristic is selected based on a delay associated with particular live content as compared to a predetermined threshold. For live content for which the delay is below the threshold, a low latency streaming heuristic is selected which is designed to handle live content streams for which the delay between the playheads is very short (e.g., content for which only a few seconds of content can be buffered). For live content for which the delay is above the threshold, a higher latency streaming heuristic is selected which is designed to handle streams for which the delay is sufficient to build a sufficiently long buffer of content fragments.

Figure 1:
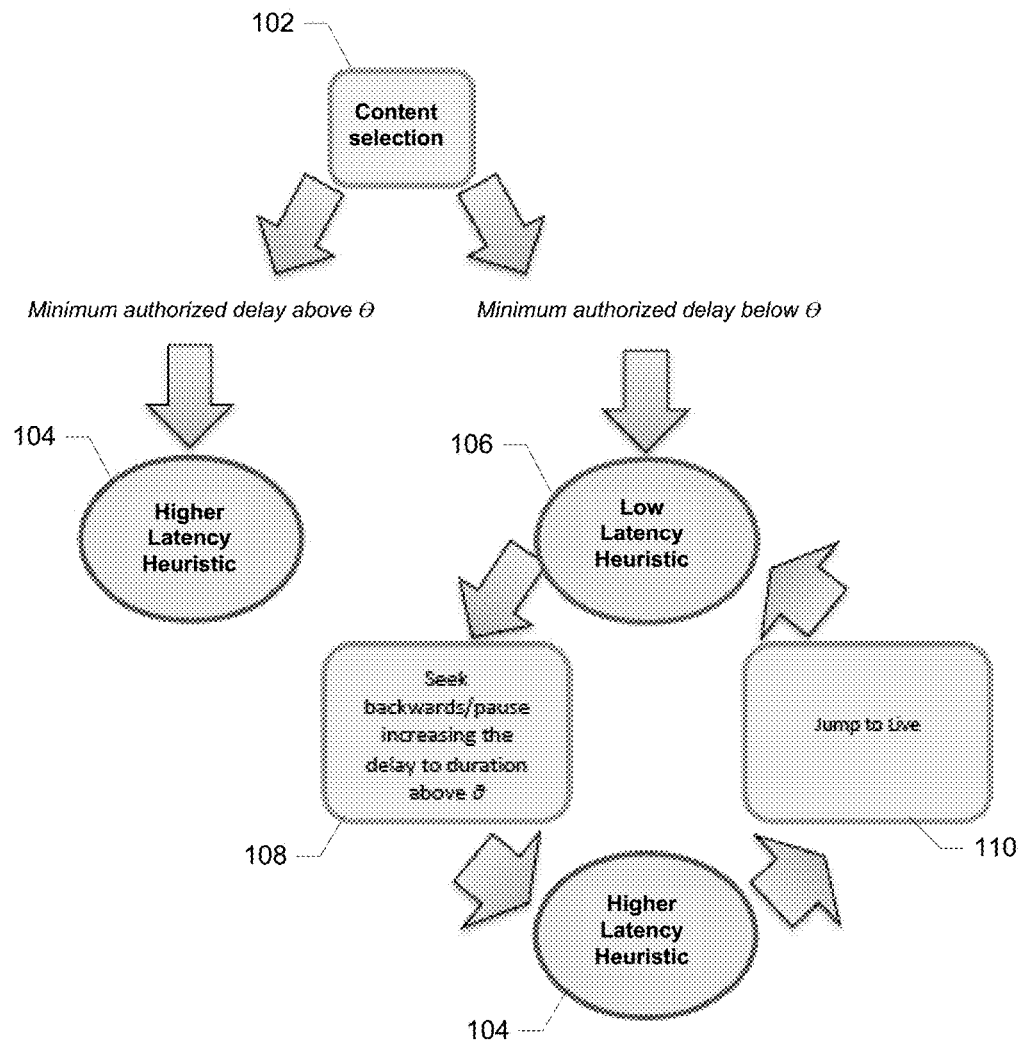
FIG. 1 illustrates interaction between different live streaming heuristics according to a particular implementation.

According to a particular class of implementations, the low latency streaming heuristic requests two versions of available fragments; a lower quality version used as security to maintain the content stream if, for example, network conditions deteriorate; and a higher quality version, the quality of which may be based, for example, on the client's available bandwidth, the client device type, etc. In a particular implementation, the higher latency heuristic employs a variable bitrate algorithm that requests only one version of each available fragment based on any of a variety of parameters (e.g., available bandwidth, client device type, etc.). The interplay between these heuristics may be understood with reference to the diagram of FIG. 1.

In the depicted example, each unit of live content (e.g., movie, TV show, broadcast event, etc.) has a specified minimum delay that guides the initial heuristic selection. The specified delay is an enforced minimum, i.e., the actual delay between the live and client playheads is not allowed to drop below the specified delay. When the client selects live content (e.g., channel selection 102), the specified minimum delay is compared to a threshold θ. If the delay is greater than the threshold, the higher latency heuristic 104 is selected. And because the specified minimum delay is enforced, playback of the live content can reliably remain with this heuristic. This might be appropriate, for example, for live content for which longer delays are tolerable, e.g., scheduled content such as movies or television shows. Notwithstanding the foregoing, it should be noted that implementations are contemplated in which reductions in delay result in selection of a different streaming heuristic despite this initial selection.

If the specified minimum delay is below the threshold θ, the low latency heuristic 106 is initially selected. This might be appropriate, for example, for live content for which it is desirable to have the client playhead as close in time to the live playhead as possible, e.g., a live sporting event. But it might also be the case that, during playback, the viewer uses navigation controls (e.g., pause, seek backwards, etc.) or a rebuffering event occurs that causes the actual delay between the live and client playheads to increase. Where this happens, and the actual delay is greater than the threshold θ (108), the higher latency heuristic 104 can be selected. Conversely, when the viewer takes action that causes the delay to drop below the threshold θ (e.g., seek forward, "jump to live" 110, etc.), the low latency heuristic 106 is again selected. Thus, for certain types of live content, the appropriate heuristic can be selected to ensure the best viewer experience.

Figure 2:
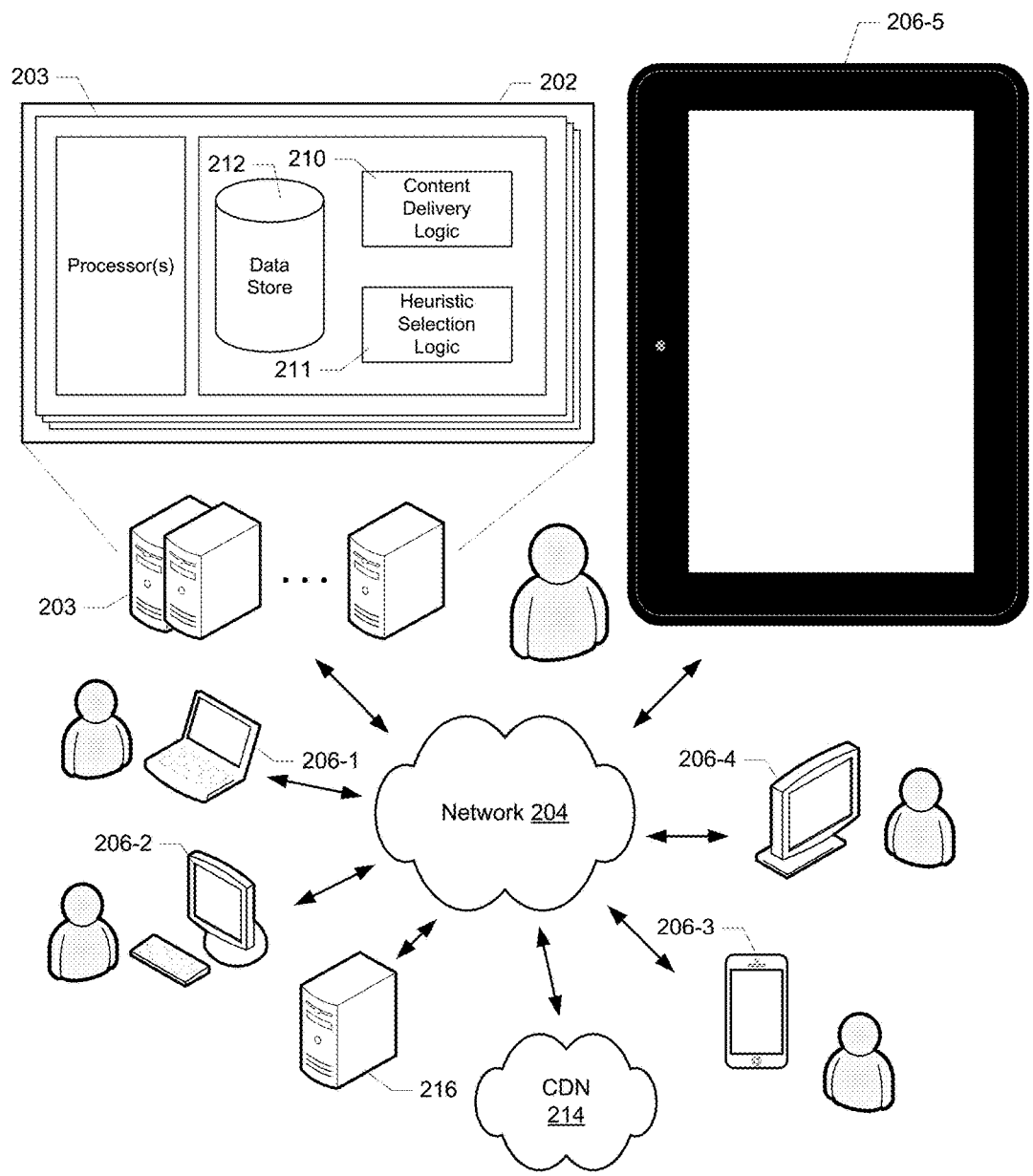
FIG. 2 is a simplified diagram of an example of a network computing environment in which various implementations may be practiced.

FIG. 2 illustrates an example of a computing environment in which a video content service 202 provides live streaming content (e.g., audio or video) via network 204 to a variety of client devices (206-1 through 206-5) in accordance with the techniques described herein. Content service 202 may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, etc. Client devices 206 may be any suitable device capable of connecting to network 204 and consuming live streaming content provided by service 202. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices (e.g., smart watches), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 202 is described as if it were integrated with the platform(s) that provides the live streaming content to client devices. However, it will be understood that content service 202 may provide access to live streaming content in conjunction with one or more content delivery networks (e.g., CDN 214) that may or may not be independent of content service 202. The range of variations known to those of skill in the art are contemplated to be within the scope of this disclosure.

Some of the implementations enabled by the present disclosure contemplate logic resident on the client devices consuming live streaming content from content service 202; such logic being configured to make decisions in conjunction with consuming the video content such as, for example, selecting and switching between streaming heuristics. The logic might be part of an existing algorithm or module on the client device or implemented to work in conjunction with such an algorithm or module. The logic might be implemented, for example, in a media player on the client device or as a separate application or module resident on the client device. It should also be noted that implementations are contemplated in which, in addition to content delivery logic 210 (which facilitates various aspects of content delivery to client devices 206), content service 202 may include logic that facilitates at least some aspects of the delivery of live streaming content as described herein (e.g., as represented by heuristic selection logic 211). For example, such logic, might notify the client of a minimum allowable delay for particular live content, or provide other information that may be used by the heuristics to guide fragment selection (e.g., network conditions).

In addition to providing access to the live streaming content, content service 202 may also include a variety of information related to the live streaming content (e.g., associated metadata and manifests in data store 212 to which service 202 provides access. Alternatively, such information about the live streaming content, as well as the live streaming content itself may be provided and/or hosted by one or more separate platforms, e.g., CDN 214. It should be noted that, while logic 210 and data store 212 are contemplated as integrated with content service 202, implementations are contemplated in which either or both operate remotely from the associated content service, and/or either or both are under the control of an independent entity. From these examples, those of skill in the art will understand the diversity of use cases to which the techniques described herein are applicable.

Figure 3:
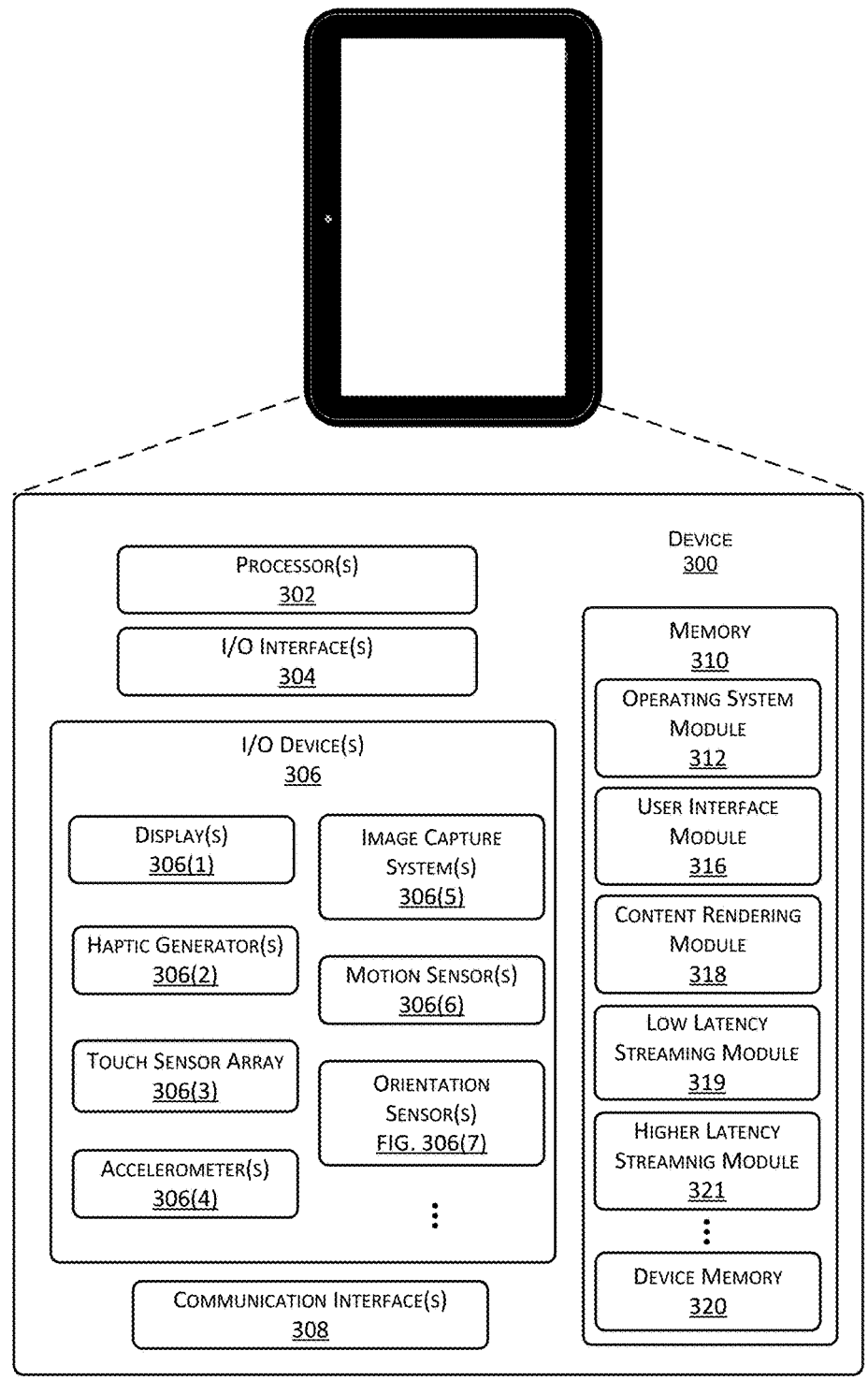
FIG. 3 is a simplified block diagram of an example of a client device with which various implementations may be practiced.

A block diagram of an example of a client device 300 suitable for use with various implementations is shown in FIG. 3. Device 300 includes one or more single or multi-core processors 302 configured to execute stored instructions (e.g., in device memory 320). Device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface, and so forth. I/O interface(s) 304 is coupled to one or more I/O devices 306. The I/O device(s) 306 may include one or more displays 306(1), one or more haptic generators 306(2), a touch sensor array 306(3), one or more accelerometers 306(4), one or more image capture systems 306(5), one or more motion sensors 306(6), one or more orientation sensors 306(7), microphones, speakers, and so forth. The one or more displays 306(1) are configured to provide visual output to the user and may comprise any of a variety of display types including, for example, any type of reflective or transmissive display. Touch sensor array 306(3) may be any of a variety of arrays configured to determine the location, duration, speed and direction of touch events on or near the device's display.

Device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Device 300 also includes one or more buses or other internal communications hardware or software that allow for the transfer of data and instructions between the various modules and components of the device.

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content rendering module 318, and other modules. Memory 310 also includes device memory 320 to store a wide variety of instructions and information using any of a variety of formats including, for example, flat files, databases, linked lists, trees, or other data structures. Such information includes content for rendering and display on display 306(1) including, for example, any type of video content. In some implementations, a portion of device memory 320 may be distributed across one or more other devices including servers, network attached storage devices, and so forth.

The logic or computer program instructions used to support streaming heuristic selection and operation as described herein (represented by low latency streaming module 319 and higher latency streaming module 321) may be implemented in a variety of ways. For example, at least some of this functionality may be implemented as part of the code of a media player operating on device 300. Alternatively, modules 319 and 321 may be implemented separately from the device's media player.

And as mentioned above, implementations are contemplated in which at least a portion of the logic or computer program instructions may reside on a separate platform, e.g., service 202, CDN 214, server 216, etc. Suitable variations and alternatives will be apparent to those of skill in the art. It will also be understood that device 300 of FIG. 3 is merely an example of a device with which various implementations enabled by the present disclosure may be practiced, and that a wide variety of other devices types may also be used (e.g., devices 206-1 to 206-5). The scope of this disclosure should therefore not be limited by reference to device-specific details.

Figure 4:
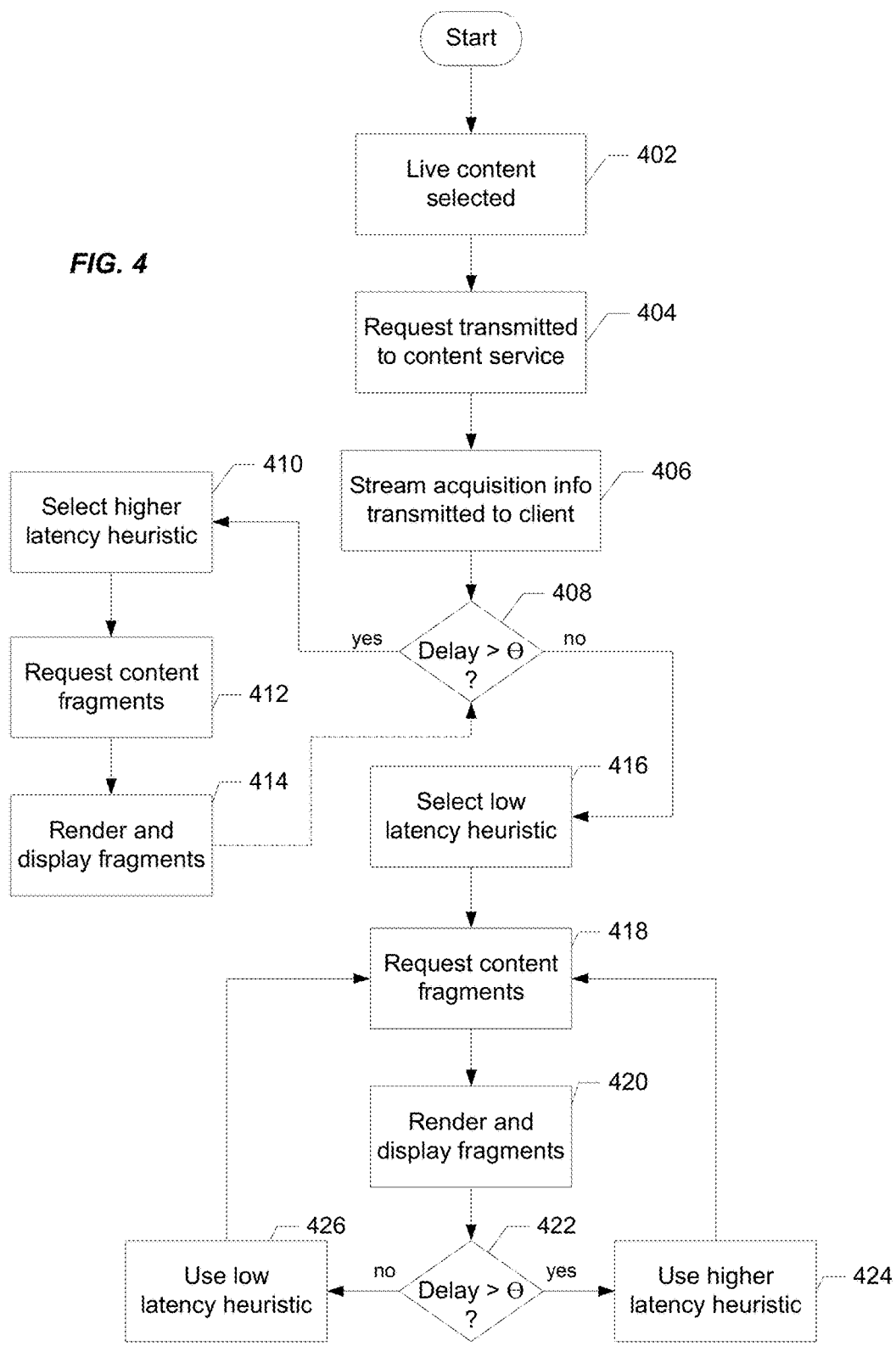
FIG. 4 is a flowchart illustrating operation of a particular implementation.

The delivery of live streaming content to a client device according to a particular implementation is illustrated in the flow chart of FIG. 4. This and other examples described herein assume the use of H.264 encoding for video content. However, it will be understood that the basic principles described herein may be employed with any of a variety of video and audio codecs including, for example, MPEG-1, MPEG-2, MPEG-4 Part 2, VC-1, H.263, VP8, VP9, Daala, and H.265 (also commonly referred to as HEVC). The example illustrated in FIG. 4 also assumes a media player on the client device that includes logic (e.g., modules 319 and 321) configured to manage at least some aspects of streaming heuristic selection and operation as described herein. Again, these details are merely presented by way of example.

When a user wants to connect with a content service using a client device, the connection is typically achieved through some kind of login process to the service in a user interface presented on the client device. Content playback is provided, for example, via a resident media player, web browser, or mobile app. Access to content over the Internet is typically governed by a DRM system such as Google's Widevine, Microsoft's PlayReady, Apple's FairPlay, or Sony's OpenMG to name a few representative examples. Live streaming content is typically delivered in an encrypted stream using any of a variety of encryption technologies including, for example, various Advanced Encryption Standard (AES) and Elliptic Curve Cryptography (ECC) encryption techniques. It should be noted that the techniques described herein are compatible with a wide range of content services, media players, DRM systems, and encryption technologies, the details of which are known to those of skill in the art. The nature and operation of these technologies will therefore not be described in detail to promote clarity.

When a live content channel is selected in a user interface on a client device (402), a request for the content is sent to the corresponding content service (404). The content service provides the client device with the information the client device needs to acquire a stream of the content (406). This may include, for example, DRM licenses, a decryption key, content metadata, and information about where the client can request the fragments of the selected content at various resolutions (e.g., a manifest). According to the depicted implementation, the content metadata includes a value representing a minimum allowable delay for that content, i.e., the shortest delay between the live and client playheads that will be tolerated for the content.

In this example, the initial choice of streaming heuristics is done using this value which is set depending on the type of content. For example, for some broadcast content (e.g., movie channels or TV channels with reliably fixed schedules) a relatively long delay may not have much of an impact on the viewer's experience. Therefore, for such content it may be appropriate to constrain the minimum allowable delay to a relatively high value to favor the selection and use of a heuristic that emphasizes the reliable buffering of higher quality fragments. On the other hand, for some broadcast content (e.g., live sporting events) it is important to keep the delay between the live and client playheads as low as possible as viewers have an expectation that the content is being presented in near real time. In such cases, the minimum allowable delay may be set very low to favor the selection and use of a heuristic that emphasizes maintaining the content stream even where only a very small amount of content (e.g., 2 fragments, 4 seconds, etc.) may be buffered.

Referring again to FIG. 4, the minimum delay associated with the selected content is compared to a threshold θ. The threshold θ may be selected in various implementations to strike the desired balance between latency on the one hand, and the reliability and/or quality of the content on the other. The threshold θ might also depend on one or more characteristics of the client device and/or the higher latency streaming heuristic. For example, if the higher latency heuristic attempts to maintain a buffer of fragments, the threshold θ might be set at or near the length of that buffer so that the appropriate heuristic is selected based on the ability of the device to keep up with available fragments. Thus, the range of values for θ might be from a few seconds to over a minute depending on the length of the buffer being maintained by the higher latency heuristic.

Where the specified delay is above the threshold (408), a higher latency streaming heuristic is selected that is designed to take a relatively conservative approach to variable bitrate selection to ensure a reliable buffer length and a relatively high quality of content (410). Content fragments are then requested by the client device from the content service according to the higher latency heuristic (412), and the fragments are rendered and displayed by the client device (414). And because the minimum allowable delay as specified is above the threshold, content fragment selection may remain with the selected heuristic. Alternatively, and as represented by the dashed arrow from 414 to 408, monitoring of the actual delay between the live and client playheads may result in selection of the low latency heuristic despite the initial selection.

The higher latency streaming heuristic may employ any of a wide range of conventional or proprietary techniques for selecting content fragments. According to a particular implementation, the higher latency streaming heuristic might be any of a wide variety of variable bitrate algorithms. Implementations are also contemplated in which fixed bitrate selection might be employed. More generally, any of a wide variety of heuristics that attempt to maintain a buffer of content fragments may be employed as the higher latency streaming heuristic.

Where the specified delay associated with selected content is below the threshold (408), a low latency streaming heuristic is selected that is designed for situations in which the delay between playheads is intended to be very small and only a small amount of content may be buffered (416). Content fragments are then requested by the client device from the content service according to the low latency heuristic (418), and the fragments are rendered and displayed by the client device (420).

According to a particular class of implementations, the low latency streaming heuristic involves the selection of multiple versions of at least some of content fragments of the selected content, i.e., a higher bitrate version and a lower bitrate version of each of the fragments. The lower bitrate version (also referred to herein as the lower quality version) is available as a sort of failsafe to maintain the content stream if, for example, network conditions deteriorate. When a particular fragment is to be rendered and displayed, the higher bitrate version (also referred to herein as the higher quality version) is selected if it is available, e.g., if it has been fully downloaded. Otherwise, the lower quality version of the fragment is rendered and displayed. If neither is available, a rebuffering event occurs and the client device skips ahead to the latest playable fragment (which might correspond, for example, to the live playhead).

According to some implementations, the actual delay between the live playhead and the client playhead may be monitored to enable switching between heuristics as conditions warrant. For example, the client can determined the client playhead as that corresponds to the current fragment being rendered. The client can also determine or approximate the live playhead from the manifest which indicates the most current fragment that is available to be requested. The difference in time between these fragments (e.g., derived using frame or fragment time stamps) is at least a close approximation of the actual delay between playheads. Thus, for example, if the user of the client device uses playback controls to pause, or seek backward in the content, or a rebuffering event occurs, the actual delay between the live playhead and the client playhead will increase. Where the actual delay goes above the threshold θ (422), selection of fragments may be done by the higher latency heuristic (424). And where the actual delay drops back below the threshold (422) (e.g., because of use of the seek forward or "jump to live" functionalities), selection of fragments may switch back to the low latency heuristic (426). In this way, depending on how close playback is to the live playhead, the appropriate heuristic may be selected to preserve an acceptable level of quality of the viewer experience for the current conditions.

It should be noted that implementations are contemplated in which a minimum allowable delay between the live and client playheads need not be specified. For example, initial selection of a heuristic might be based on network conditions (e.g., the bandwidth available to the requesting client device), the device type, etc. Heuristic selection might also be driven by expressed user preferences. For example, a user might want to view content as close to live as possible which might drive selection (at least initially) of the low latency heuristic. Alternatively, a user might elect to watch a program from its beginning (rather than at the live playhead), in which case a sufficient buffer of fragments could be built, therefore driving selection (at least initially) of the higher latency heuristic. Subsequent switching between heuristics might then be triggered by fluctuations in the actual delay between the playheads. In addition, implementations are contemplated in which switching between the low and higher latency heuristics is triggered by information other than and/or in addition to the actual delay between the live and client playheads (e.g., network conditions, available bandwidth, device type, user preferences, etc.). The scope of this disclosure should therefore not be limited by reference to the specific details of the examples described.

As discussed above, the low latency streaming heuristic is intended to handle situations in which there is a very short delay between the live playhead and the client playhead (i.e., the client device is not able to buffer more than a few seconds of content), and requests two versions of the same fragments most of the time (i.e., a lower quality version and a higher quality version). Depending on the device and the conditions, there may be multiple options available for each version. Therefore, implementations are contemplated in which bitrate selection decisions are made for each version of the fragments requested.

Figure 5:
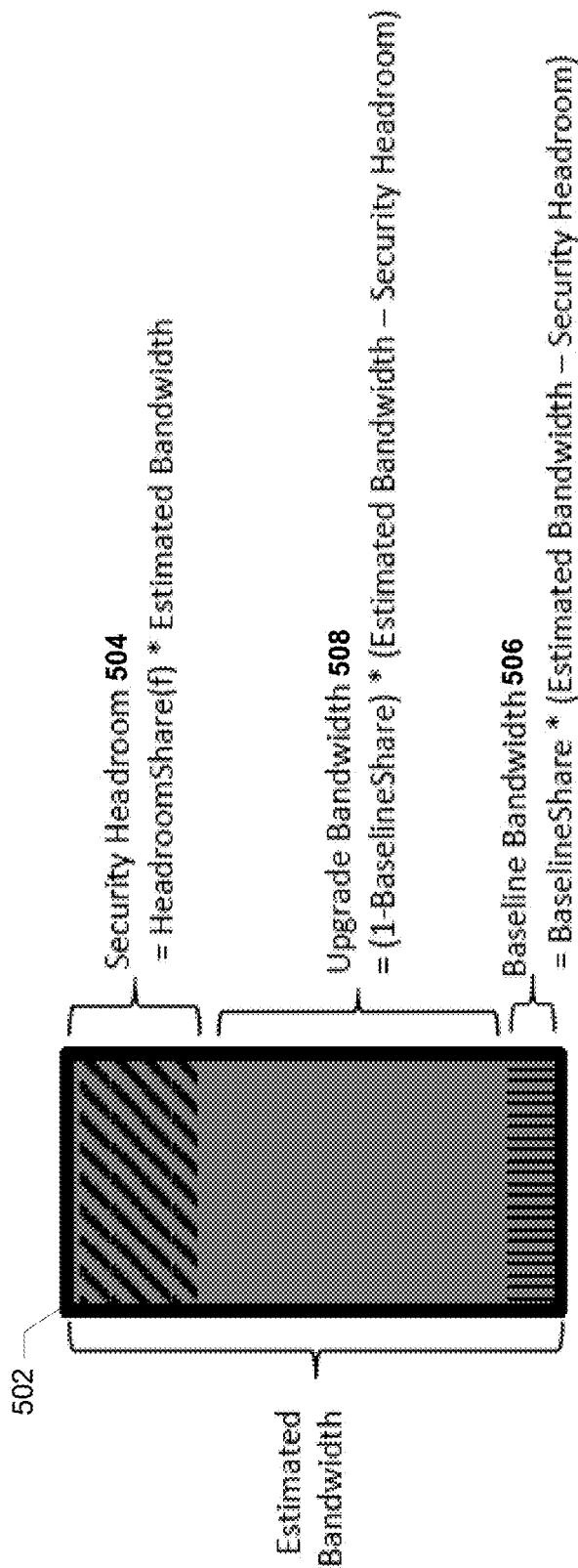
FIG. 5 is a diagram illustrating allocation of bandwidth in connection with a low latency streaming heuristic.

According to a particular implementation, fragment/bitrate selection in connection with a low latency streaming heuristic involves estimating the bandwidth that will be available to download the next fragment based on one or more bandwidth measurements (e.g., the measured bandwidth for the past N fragments received). The estimated available bandwidth (which might be the average or the minimum value of the bandwidth measurements) can then be divided into 3 components as illustrated in FIG. 5.

Estimated bandwidth 502 includes a security headroom component 504, a baseline bandwidth component 506, and an upgrade bandwidth component 508. Security headroom component 504 is included as a safety margin to avoid overconsumption of the actual available bandwidth. This portion of estimated bandwidth 502 is ignored when the bitrates of the fragments are selected. According to a particular implementation discussed in more detail below, the size of security headroom component 504 relative to estimated bandwidth 502 is dynamic (e.g., according to previous failure and success) and varies inside a specific range.

Baseline bandwidth component 506 corresponds to the lower quality version of the next fragment, also referred to herein as the baseline version. In the depicted example, the size of baseline bandwidth component 506 relative to estimated bandwidth 502 is specified by a parameter called "BaselineShare" which must be below 50%. Upgrade bandwidth component 508 corresponds to the higher quality version of the next fragment, also referred to herein as the upgrade version. In the depicted example, upgrade bandwidth component is the remainder of estimated bandwidth 502, and so also is at least indirectly specified by BaselineShare as depicted.

According to a particular implementation, the size of security headroom component 504 is delimited by an upper bound "MaxHeadroomShare" (e.g., 25% of estimated bandwidth 502) and a lower bound "MinHeadroomShare" (e.g., 10% of estimated bandwidth 502) and is specified by the parameter "HeadroomShare" which varies over time as follows. For the first fragment selected according to the low latency heuristic, HeadroomShare is set to MaxHeadroomShare. The value of HeadroomShare then decreases for each successive fragment for which the upgrade version of the fragment is rendered (as opposed to the baseline version of the fragment). According to a more specific implementation, the decrease in the size of HeadroomShare is linear according to a parameter "HeadroomShareStep" which is applied each time the upgrade version of a fragment is rendered. If for a given fragment, the upgrade version cannot be downloaded in time to render it (the baseline version is rendered or rebuffering event occurs), the value of HeadroomShare is set back to MaxHeadroomShare.

For the baseline version of a fragment, the highest available bitrate is selected that is below or equal to the size of baseline bandwidth component 506. For the upgrade version of a fragment, the highest available bitrate is selected that is below or equal the size of upgrade bandwidth component 508, and that exceeds the quality level of the baseline fragment by at least "MinQualityDifference." That is, it may not make sense to request a higher bitrate version of a fragment if the difference in quality isn't sufficiently large, i.e., the difference in quality doesn't justify the risk that a fragment might get dropped. For example, if the bitrate of the baseline fragment is 150 kbps (with bitrate being a proxy for quality level), fragments are also available at 200 kpbs, 300 kbps, 450 kbps, 600 kbps, and MinQualityDifference=3, only bitrates at or above 450 kbps are eligible for the upgrade fragment. If no bitrates are eligible, only the baseline version of the fragment is selected. In some cases where only one fragment is selected, the fragment may be selected at a higher bitrate than the baseline bandwidth would have otherwise allowed. In the previous example, instead of selecting only the 150 kbps fragment, the heuristic might instead select the 200 or 300 kbps fragment.

According to a specific implementation, the low latency streaming heuristic schedules fragment requests as follows. The latency of each fragment is estimated from an average latency measured for the N previous fragments requested, and each fragment triggers the request of the next fragment when it is about to complete downloading. For example, if the estimated latency is 100 ms, the request of the next fragment is triggered to download 100 ms before the expected time of reception of the last byte of the fragment currently downloading. According to some implementations, it may be desirable to limit the number of concurrent overloads (e.g., no more than two), and/or to minimize the overlap between concurrent downloads.

According to a particular implementation, the baseline version of a fragment is always requested before the upgrade version, and the request of the upgrade version is triggered so that its first byte is expected to be received when the download of the baseline version of the same fragment is complete. For a steady state defined by the rendering of the upgrade version of a previous fragment, the request of a baseline fragment f is triggered based on the estimated reception of the last byte of the upgrade version of the previous fragment f−1. The request of an upgrade fragment f is triggered based on the estimated reception of the last byte of the baseline version of the same fragment f.

A departure from this steady state condition occurs if the upgrade version of a fragment cannot be fully downloaded before the moment it must be rendered. In this case, the download of the upgrade version is canceled and the baseline version of the next fragment is requested immediately (i.e., close in time to the rendering of the current baseline fragment).

Another departure from the steady state condition occurs if the constraint on the minimum quality level distance between the baseline version and the upgrade version of a fragment (e.g., as specified by MinQualityDifference) does not enable the request of an upgrade version of the fragment. In this case the request of the baseline version of the next fragment is triggered by the expected download completion of the baseline version of the current fragment.

Yet another departure from the steady state condition occurs if the baseline version of a fragment cannot be fully downloaded before the moment it must be rendered. In this case, the download of the baseline fragment is canceled, and the baseline version of the most recent playable fragment is requested immediately (i.e., a rebuffering event).

Techniques enabled by the present disclosure allow for the selection of distinct heuristics to govern the request of fragments of live content in situations in which the delay between the live playhead and the client playhead may vary significantly. The heuristics are designed to handle different ranges of delay, e.g., one being for situations in which the client device's ability to build a buffer of fragments is very limited, and another being for situations in which a reasonably long buffer can be built. Content may be designated (e.g., through the use of a minimum allowable delay) in order to drive heuristic selection; both initially as well as after playback has begun. But, as mentioned above, such designation is not necessary to be within the scope of this disclosure. And the options for heuristics are not limited to two. That is, implementations are contemplated in which more than two heuristics may be available for selection based on the delay between the live and client playheads, and possibly other circumstances or conditions. In addition, various parameters described herein that support heuristic selection and operation may be manipulated to refine operation for particular applications.

More generally, while the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
transmitting a first request for first live content;
receiving first metadata associated with the first live content, the first metadata specifying a first minimum allowable delay between a client playhead for the first live content and a live playhead for the first live content, the first minimum allowable delay representing a lower bound on an actual delay between the client playhead for the first live content and the live playhead for the first live content;
determining that the first minimum allowable delay is higher than a delay threshold;
prior to initiating streaming of the first live content, selecting a first streaming heuristic from among a plurality of streaming heuristics in response to determining that the first minimum allowable delay is higher than the delay threshold, each of the streaming heuristics employing a bitrate selection algorithm configured to request content fragments;

requesting fragments of the first live content according to the variable bitrate algorithm;

rendering the first live content using the fragments of the first live content;

transmitting a second request for second live content;

receiving second metadata associated with the second live content, the second metadata specifying a second minimum allowable delay between a client playhead for the second live content and a live playhead for the second live content, the second minimum allowable delay representing a lower bound on an actual delay between the client playhead for the second live content and the live playhead for the second live content;

determining that the second minimum allowable delay is lower than the delay threshold;

prior to initiating streaming of the second live content, selecting a second streaming heuristic from among the plurality of streaming heuristics in response to determining that the second minimum allowable delay is lower than the delay threshold, the second streaming heuristic being different than the first streaming heuristic;

requesting, using the second streaming heuristic, a first fragment at a first bitrate and a second fragment at a second bitrate lower than the first bitrate, the first fragment and the second fragment corresponding to a same segment of the second live content, the first fragment and the second fragment being independently displayable, wherein the second fragment is requested regardless of whether downloading of the first fragment succeeds;

determining that the first fragment has not been fully downloaded; and rendering the second live content using the second fragment instead of the first fragment.

2. The method of claim 1, further comprising:

determining that the actual delay between the client playhead for the second live content and the live playhead for the second live content is higher than the delay threshold; and switching to the first streaming heuristic for requesting fragments of the second live content in response to determining that the actual delay between the client playhead for the second live content and the live playhead for the second live content is higher than the delay threshold.

3. The method of claim 2, wherein at least a portion of the actual delay between the client playhead for the second live content and the live playhead for the second live content is due to usage of content playback controls in connection with playback of the second live content, or a rebuffering event.

4. The method of claim 2, further comprising:

determining that the actual delay between the client playhead for the second live content and the live playhead for the second live content is lower than the delay threshold; and switching back to the second streaming heuristic for requesting fragments of the second live content in response to determining that the actual delay between the client playhead for the second live content and the live playhead for the second live content is lower than the delay threshold.

5. A computer-implemented method, comprising:

transmitting a first request for first content;

receiving first metadata associated with the first content, the first metadata identifying a first minimum allowable delay between a client playhead for the first content and a live playhead for the first content, the first minimum allowable delay representing a lower bound on an actual delay between the client playhead for the first content and the live playhead for the first content;

determining that the first minimum allowable delay is lower than a delay threshold;

prior to initiating streaming of the first content, selecting a first streaming heuristic from among a plurality of streaming heuristics in response to determining that the first minimum allowable delay is lower than the delay threshold, each of the streaming heuristics employing a bitrate selection algorithm configured to request content fragments;

requesting, using a first bitrate selection algorithm corresponding to the first streaming heuristic, a first fragment of the first content at a first bitrate and a second fragment of the first content at a second bitrate lower than the first bitrate, the first fragment and the second fragment corresponding to a same segment of the first content, the first fragment and the second fragment being independently displayable, wherein the second fragment is requested regardless of whether downloading of the first fragment succeeds;

determining that the first fragment has not been fully downloaded;

rendering the second fragment instead of the first fragment;

transmitting a second request for second content;

receiving second metadata associated with the second content, the second metadata identifying a second minimum allowable delay between a client playhead for the second content and a live playhead for the second content, the second minimum allowable delay representing a lower bound on an actual delay between the client playhead for the second content and the live playhead for the second content;

determining that the second minimum allowable delay is higher than the delay threshold;

prior to initiating streaming of the second content, selecting a second streaming heuristic from among the plurality of streaming heuristics in response to determining that the second minimum allowable delay is higher than the delay threshold;

requesting, using a second bitrate selection algorithm corresponding to the second streaming heuristic, fragments of the second content; and rendering the fragments of the second content.

6. The method of claim 5, further comprising:

determining that the actual delay between the client playhead for the first content and the live playhead for the first content is above the delay threshold;

switching to the second streaming heuristic in response to determining that the actual delay between the client playhead for the first content and the live playhead for the first content is above the delay threshold; and requesting fragments of the first content according to the second streaming heuristic.

7. The method of claim 6, wherein the second streaming heuristic employs a variable bitrate algorithm.

8. The method of claim 6, wherein at least a portion of the actual delay between the client playhead for the first content and the live playhead for the first content is due to usage of content playback controls in connection with playback of the first content, or a rebuffering event.

9. The method of claim 6, further comprising:
determining that the actual delay between the client playhead for the first content and the live playhead for the first content is below the delay threshold; and
switching back to the first streaming heuristic for requesting fragments of the first content in response to determining that the actual delay between the client playhead for the first content and the live playhead for the first content is below the delay threshold.

10. The method of claim 5, further comprising:
determining an available bandwidth; and
selecting the first fragment and the second fragment based on the available bandwidth.

11. A computing device, comprising:
memory;
a display;
one or more processors configured to:
transmit a first request for first content;
receive first metadata associated with the first content, the first metadata identifying a first minimum allowable delay between a client playhead for the first content and a live playhead for the first content, the first minimum allowable delay representing a lower bound on an actual delay between the client playhead for the first content and the live playhead for the first content;
determine that the first minimum allowable delay is lower than a delay threshold;
prior to initiating streaming of the first content, select a first streaming heuristic from among a plurality of streaming heuristics in response to determining that the first minimum allowable delay is lower than the delay threshold, each of the streaming heuristics employing a bitrate selection algorithm configured to request content fragments;
request, using a first bitrate selection algorithm corresponding to the first streaming heuristic, a first fragment of the first content at a first bitrate and a second fragment of the first content at a second bitrate lower than the first bitrate, the first fragment and the second fragment corresponding to a same segment of the first content, the first fragment and the second fragment being independently displayable, wherein the second fragment is requested regardless of whether downloading of the first fragment succeeds;
determine that the first fragment has not been fully downloaded;
render the second fragment instead of the first fragment;
present the first content on the display;
transmit a second request for second content;
receive second metadata associated with the second content, the second metadata identifying a second minimum allowable delay between a client playhead for the second content and a live playhead for the second content, the second minimum allowable delay representing a lower bound on an actual delay between the client playhead for the second content and the live playhead for the second content;
determine that the second minimum allowable delay is higher than the delay threshold;
prior to initiating streaming of the second content, select a second streaming heuristic from among the plurality of streaming heuristics in response to determining that the second minimum allowable delay is higher than the delay threshold;
request, using a second bitrate selection algorithm corresponding to the second streaming heuristic, fragments of the second content;
render the fragments of the second content; and
present the second content on the display.

12. The computing device of claim 11, wherein the one or more processors are further configured to:
determine that the actual delay between the client playhead for the first content and the live playhead for the first content is above the delay threshold;
switch to the second streaming heuristic in response to determining that the actual delay between the client playhead for the first content and the live playhead for the first content is above the delay threshold; and
request fragments of the first content according to the second streaming heuristic.

13. The computing device of claim 12, wherein the second streaming heuristic employs a variable bitrate algorithm.

14. The computing device of claim 12, wherein at least a portion of the actual delay between the client playhead for the first content and the live playhead for the first content is due to usage of content playback controls in connection with playback of the first content, or a rebuffering event.

15. The computing device of claim 12, wherein the one or more processors are further configured to:
determine that the actual delay between the client playhead for the first content and the live playhead for the first content is below the delay threshold; and
switch back to the first streaming heuristic for requesting fragments of the first content in response to determining that the actual delay between the client playhead for the first content and the live playhead for the first content is below the delay threshold.

16. The computing device of claim 11, wherein the one or more processors are further configured to:
determine an available bandwidth; and
select the first fragment and the second fragment based on the available bandwidth.

17. A system, comprising one or more processors and memory configured to:
receive a first request for first content from a first client device;
transmit first metadata to the first client device in response to the first request, the first metadata specifying a first minimum allowable delay between a client playhead for the first content and a live playhead for the first content, the first minimum allowable delay representing a lower bound on an actual delay between the client playhead for the first content and the live playhead for the first content, the first minimum allowable delay being higher than a delay threshold;
transmit fragments of the first content to the first client device in response to requests from the first client device generated according to a first streaming heuristic, the first streaming heuristic corresponding to the first minimum allowable delay and employing a first bitrate selection algorithm configured to request content fragments;
receive a second request for second content from a second client device;
transmit second metadata to the second client device in response to the second request, the second metadata specifying a second minimum allowable delay between a client playhead for the second content and a live playhead for the second content, the second minimum allowable delay representing a lower bound on an actual delay between the client playhead for the second content and the live playhead for the second content, the second minimum allowable delay being lower than the delay threshold; and transmit fragments of the second content to the second client device in response to requests from the second client device generated according to a second streaming heuristic, the second streaming heuristic corresponding to the second minimum allowable delay and employing a second bitrate selection algorithm configured to request content fragments, the fragments including a first fragment and a second fragment corresponding to a same segment of the second content, the first fragment and the second fragment being independently displayable, wherein the second fragment is transmitted to the second client device regardless of whether transmission of the first fragment to the second client device succeeds.

18. The system of claim 17, wherein the actual delay between the client playhead for the second content and the live playhead for the second content increases above the delay threshold, and wherein the one or more processors and memory are further configured to transmit fragments of the second content to the second client device in response to requests from the second client device that are generated according to the first streaming heuristic and in response to the actual delay between the client playhead for the second content and the live playhead for the second content.

19. The system of claim 18, wherein the actual delay between the client playhead for the second content and the live playhead for the second content decreases below the delay threshold, and wherein the one or more processors and memory are further configured to transmit fragments of the second content to the second client device in response to requests from the second client device that are generated according to the second streaming heuristic and in response to the actual delay between the client playhead for the second content and the live playhead for the second content.

20. The system of claim 17, wherein the first streaming heuristic employs a variable bitrate algorithm.

\* \* \* \* \*